United States Patent [19]
Serratore et al.

[11] 4,091,047
[45] May 23, 1978

[54] POLYMERIC STABILIZERS FOR POLYVINYL CHLORIDE RESIN

[75] Inventors: Joseph Serratore; William L. Clayton, both of Sarnia, Canada

[73] Assignee: Exxon Research & Engineering Co., Linden, N.J.

[21] Appl. No.: 786,575

[22] Filed: Apr. 11, 1977

Related U.S. Application Data

[62] Division of Ser. No. 585,485, Jun. 10, 1975, Pat. No. 4,032,594.

[51] Int. Cl.² .............................................. C08L 63/00
[52] U.S. Cl. ................................ 260/836; 260/31.6 E
[58] Field of Search .......................................... 260/836

[56] References Cited

U.S. PATENT DOCUMENTS

| 3,100,758 | 8/1963 | Ravve | 260/837 PV |
| 3,383,372 | 5/1968 | Spivey | 260/86.7 |
| 3,639,365 | 2/1972 | Adelman | 260/80.72 |
| 3,723,570 | 3/1973 | Adelman | 260/836 |

Primary Examiner—Paul Lieberman
Attorney, Agent, or Firm—Henry Naylor; Myran B. Kurtzman

[57] ABSTRACT

A polyvinyl chloride composition having superior processing and thermal stability properties is prepared by blending with the polyvinyl chloride a copolymer of an α-olefin and an unsaturated epoxy monomer, or a terpolymer of an α-olefin, an unsaturated epoxy monomer and an epoxy-free monomer, such as an acrylate ester.

1 Claim, No Drawings

POLYMERIC STABILIZERS FOR POLYVINYL CHLORIDE RESIN

This is a division of application Ser. No. 585,485, filed June 10, 1975, now Pat. No. 4,032,594.

BACKGROUND OF THE INVENTION

Polyvinyl chloride (PVC) is presently used in myriad useful applications; some such applications involve the introduction of hot substances into containers molded from a PVC composition. Conventional PVC compositions contain additives such as liquid epoxy type stabilizers (e.g. epoxidized soybean oil). These stabilizers, when blended into the PVC resin, have a tendency to reduce the glass transition temperature (Tg) of the PVC compound; thus decreasing the softening temperature of the processed PVC product. This decrease in softening temperature leads to problems where hot substances are introduced into PVC products such as bottles; the bottles tend to sag and distort.

The instant invention overcomes these problems by blending with PVC, an epoxy type stabilizer system that results in a PVC composition with a Tg equal to or greater than the Tg for the PVC composition without the epoxy type stabilizer. More specifically, the instant invention teaches blending with PVC either a copolymer of an α-olefin and at least one unsaturated epoxy monomer or optionally blending with PVC a terpolymer comprised of the aforementioned copolymer plus an epoxy-free monomer wherein the epoxy-free monomer can also be an α-olefin.

Copolymers of unsaturated epoxy monomers and ethylene have been long known in the art. For example, U.S. Pat. No. 3,383,372 (Spivey) discloses a copolymer comprised of ethylene and glycidyl esters such as glycidyl acrylate, glycidyl methacrylate and glycidyl ethacrylate. These copolymers, as taught by Spivey, are either used alone or are modified with fillers and plasticizers as molding compositions for the manufacture of films and coating.

Another reference to copolymers of unsaturated epoxy monomers is found in U.S. Pat. No. 3,201,497 (Heino). This reference relates to epoxy resin adhesive compositions comprised of an epoxy resin, a copolymer of an ethylenically unsaturated epoxy monomer and an ethylenically unsaturated epoxy-free monomer and a curing agent for the epoxy resin.

SUMMARY OF THE INVENTION

It has surprisingly been found that when copolymers of an α-olefin and an unsaturated epoxy monomer or a terpolymer of an α-olefin, an unsaturated epoxy monomer and an epoxy-free monomer (which can also be another α-olefin) are blended with PVC, a composition is produced having superior processing and thermal stability properties. This new PVC composition also has a softening temperature higher than that for conventional PVC compositions containing liquid epoxy type stabilizers, thus enabling the production of a PVC container which will have less tendency to sag or distort when filled with hot substances. For example, the maximum use temperature for a PVC bottle produced from a conventional liquid stabilizer such as epoxidized soybean oil is about 55° C to about 65° C whereas the maximum use temperature for a PVC bottle produced with stabilizer systems of the instant invention would be about 65° C to about 75° C.

DETAILED DESCRIPTION

The term "PVC" as used in this invention is meant to include both homopolymers of polyvinyl chloride and co- and ter-polymers of vinyl chloride with comonomers such as vinyl acetate, vinyl formate, alkyl vinyl ethers, ethylene, propylene, butylenes, vinylidene chloride, alkyl acrylates and methacrylates, alkyl maleates, alkyl fumarates, etc. Preferably, at least 80%, and more preferably 100% of the monomers to be polymerized will be vinyl chloride monomer. These resins have a number average molecular weight of about 35,000 to about 120,000; preferably from about 45,000 to about 75,000. Inherent viscosity (as measured by ASTM D1243-60; Method A) will generally be in the range of about 0.5 to about 1.5, preferably in the range of about 0.7 to about 1.2. The method of preparation of these resins is not critical and, for example, any of the well known suspension techniques may be employed.

Unsaturated epoxy type monomers suitable for use in the instant invention are those which will free radically polymerize with α-olefins. These include but are not limited to glycidyl methacrylate, allyl glycidyl ether, glycidyl acrylate, vinyl glycidyl phthalate and allyl glycidyl phthalate. The preferred unsaturated epoxy monomers are glycidyl acrylate, and glycidyl methacrylate.

The epoxy-free monomers suitable for optional use in the present invention include, but are not limited to acrylate and methacrylate esters of $C_1$ to $C_{18}$, preferably $C_1$ to $C_{12}$ alcohols such as methyl methacrylate, ethyl acrylate, butyl methacrylate; styrene and substituted styrenes; acrylonitrile; vinyl esters of $C_1$ to $C_{18}$, preferably $C_1$–$C_{12}$ aliphatic monocarboxylic acids such as vinyl acetate, vinyl propionate and vinyl stearate; and α-olefins. Preferred are the alkyl acrylates and methacrylates and most preferred are the low molecular weight acrylates and methacrylates such as methyl and ethyl acrylate and methyl and ethyl methacrylate.

α-olefins suitable for use in the instant invention are generally the $C_2$ to $C_{20}$ α-olefins. Preferred are ethylene and propylene.

A typical formulation for the instant composition is as follows: about 1 to about 50 parts, preferably 2 to 20 parts of a copolymer of an α-olefin and an unsaturated epoxy monomer; or about 1 to about 50 parts, preferably 2 to 20 parts of a terpolymer of an α-olefin, an unsaturated epoxy monomer and an epoxy-free monomer, based on 100 parts of PVC. It is also understood that other ingredients such as pigments, dyes, fillers, flame retardants, impact modifiers, lubricants, processing aids, stabilizers and other conventional compounding ingredients can be incorporated into the vinyl chloride resin compositions in any convenient manner, for example by the use of high speed mixers or internal mixers.

It is to be understood that the copolymers and terpolymers of instant invention can be either prepared by copolymerization or by grafting the epoxy and/or epoxy-free monomer onto a polyolefin. It is also within the scope of this invention that the α-olefin and epoxy-type monomer can be first copolymerized and subsequently grafting the epoxy-free monomer onto the resulting copolymer or vice versa the epoxy-free monomer can be copolymerized with the α-olefin to which the epoxy-type monomer is grafted onto the resulting copolymer.

The compositions of the present invention are produced by first preparing the epoxy/α-olefin copolymer or terpolymer by procedures known in the art. For example, these copolymers can be prepared by polymerizing mixtures of α-olefin and unsaturated epoxy monomer either in tubular or autoclave reactors at pressures above about 30 atmospheres, for example, about 500 psi to about 2500 psi; preferably at a pressure of about 1100 psi and at temperatures from about 37° C to about 210° C. Where the copolymer is a graft copolymer, the polypropylene or polyethylene may first be fed into a plastics extruder wherein it is pressed and heated to a flowable or molten condition at temperatures between 130° and 250° C, and above the crystalline melting point of the polymer, under pressure. The epoxy monomer and initiator is then fed under pressure into a midsection of the barrel of the extruder and into contact with the heat-plastified or molten polymer.

Initiators suitable for use in the instant invention include: organic peroxides such as caprylyl peroxide, lauroyl peroxide, benzoyl peroxide and ditertiary butyl peroxide; organic hydroperoxides such as t-butyl hydroperoxide and cumene hydroperoxide; azocompounds such as azo-bis-isobutyro-nitrile; pivalates such as t-butyl peroxy pivalate; and peroxy dicarbonates such as diisopropyl-peroxydicarbonate. Preferred are the organic peroxide and hydroperoxides. The amount of initiator suitable for use in the instant invention is about 0.01 to about 2.0 percent based on the total weight of monomer.

It is preferred that the above-aforementioned epoxy-α-olefin copolymer or terpolymer be prepared so as to give a product in powder form. Any conventional process known in the art for giving the powder form of said polymer can be used. Such a polymer in powder form allows a more convenient procedure when blending with the PVC resin compound which is also preferred to be in powder form. It will be evident to those skilled in the art that the practice of this invention is not limited to the epoxy copolymer or terpolymer or even the PVC resin being in powder form. The materials of the present invention may also be in pellet or any other conventional form and it will also be evident to those skilled in the art that the type of blending apparatus is determined by the form of the material before blending.

Before the epoxy polymer is incorporated into the PVC compound, the PVC compound is first prepared by conventional means known in the art. If the ingredients are in the preferred powder form, they are dry blended on a high speed mixer such as a Papenmeier; or Henschel mixer at mixer speeds ranging from about 500 rpm to about 5000 rpm. It is preferred that the mixer speed be about 500 to about 1000 rpm during the first minute of mixing and thereafter the speed increased to about 1000 to about 2000 rpm for the remainder of mixing time; overall mixing time usually ranges from about 5 to about 30 minutes. The order of mixing is, however, not critical and variations may be made if desired, but a typical order of mixing is shown in Table I below.

TABLE I

| Order | Additive | Temperature (° C) | Time (Min.) |
|---|---|---|---|
| 1 | Resin | 32–38 | 1 |
| 2 | Stabilizer, (processing aid) | 60 | 5 |
| 3 | Impact Modifier | 82 | 5 |
| 4 | Copolymer or terpolymer | 90–110 | 5 |
| 5 | Transfer from hot mixer to cool mixer | 70–95 | 5 |

If the epoxy polymer is in powder form, it may be dry blended with the above PVC resin and various ingredients in a high speed mixer. If the epoxy polymer is in pellet form or any other bulk form, then it is evident to those skilled in the art that such materials can be blended in a Banbury, an extruder, a rubber blender or even in a Brabender as used in the examples of the instant application.

The term glass transition temperature (Tg) as used in the instant specification and claims means the temperature at which the amorphous domains of a polymer take on the characteristic properties of the glassy state; that is, brittleness, stiffness and rigidity. In other words, it is the temperature at which the polymer changes from a plastic state to a brittle, vitreous state or vice versa.

All glass transition temperature measurements of the instant invention were made on a Perkin Elmer Differential Scan Calorimeter (DSC model 1B). All samples were vacuum dried for 36 hours at 0.1 mm Hg before analyzing.

BRABENDER STABILITY TEST

The Brabender Heat Stability Test used to determine the long range processing stability of the instant PVC compounds was performed on a Brabender torque rheometer fitted with a 30 ml roller head (5/2) and a 5 kg ram weight. A Moseley Autograf Model 7101B recorder was used to continuously monitor the temperature.

The Brabender conditions were as follows:
Head Temperature:177° C
Sensitivity:5:1
Zero Suppression:to keep pen on scale
Damping at X 1:15 secs. (1000–100 mg)
Rotor Speed:35 and 143 rpm
Scale:X 5
Sample Charge Weight:22 g The Brabender was set at 35 rpm and 22 gr of PVC compound was charged through a cooled chute wherein the ram weight was applied. When the ram weight reached bottom, the Brabender and Moseley chart were simultaneously started. One minute after fusion, the rotor speed was increased from its original speed of 35 rpm to 143 rpm as quickly as possible. When the torque rose 100 meter grams, the test was discontinued.

BRABENDER FUSION TEST

Another test used on the compositions of the instant invention is the Brabender Fusion Test. This test was performed on a Brabender as previously described in the Brabender Stability Test. The Brabender conditions for the Fusion Test were as follows:
Head Temperature:215° C
Sensitivity:5:1
Zero Suppression:to keep pen on scale
Damping at X 1:20 sec. (1000–100 mg)
Rotor Speed:25 rpm
Sample Charge Weight:23 g The Brabender was set at 35 rpm and 23 gram of PVC composition was charged through a cooled chute wherein the ram weight was applied. When the ram weight reached bottom, the Brabender and Moseley chart were simultaneously started. Two minutes after fusion torque peak, the test was discontinued.

The invention will be further understood by reference to the following description and examples.

EXAMPLES 1 – 5

A dry blend according to the Basic Formula in Table II was prepared in a high speed Papenmeier mixer by first mixing at a speed of 1200 rpm for 1 minute then further mixing for an additional 2 minutes at a speed of 3600 rpm.

TABLE II

| BASIC PVC FORMULA | |
|---|---|
| Ingredient | phr |
| PVC resin[a] | 100 |
| Impact Modifier[b] | 15 |
| Processing Aid[c] | 3 |
| Stabilizer I[d] | 2 |
| Stabilizer II[d] | 1 |
| Lubricant I[e] | 1.25 |
| Lubricant II[f] | 0.25 |
| Lubricant III[g] | 0.5 |
| Lubricant IV[g] | 0.5 |

[a]Resin of PVC homopolymer with a number average molecular weight of about 50,000.
[b]Mainly polymethyl methacrylate - an impact modifier.
[c]Methyl methacrylate - butadiene - styrene terpolymer (MBS) - a processing aid.
[d]Organotin - thermal stabilizers.
[e]Glyceryl monostearate - lubricant.
[f]Low molecular weight polyethylene - lubricant.
[g]General lubricants such as stearates or stearic acid.

To the basic formulation above, four separate samples were prepared according to Table III.

TABLE III

| Sample | Additions to Basic Formulation |
|---|---|
| E-1 | Basic formulation only |
| E-2 | Basic formulation plus 5 phr Epoflex 945 (an epoxidized soybean oil). |
| E-3 | Basic formulation plus 5 phr of a copolymer of polypropylene and glycidyl acrylate (2 wt %). |
| E-4 | Basic formulation plus 5 phr of a graft copolymer of low density polyethylene and glycidyl acrylate (1 wt %). |
| Sample | |
| E-5 | Basic formulation plus 5 phr of a terpolymer of polypropylene, polyethylene (6 wt %) and glycidyl acrylate (2 wt %). Made by grafting glycidyl acrylate onto a polypropylene polyethylene copolymer. All weight percentages based on the total weight of the co- or terpolymer. Brabender stability and fusion tests were run according to the method previously set-forth, and the results are found in Table IV and V. |

TABLE IV

| | Brabender Stability Test | | |
|---|---|---|---|
| Sample | Time to Breakdown, min. | Breakdown Torque, mgm | Temp., ° C |
| E-1 | 14.5 | 1530 | 216 |
| E-2 | 17.0 | 1300 | 217 |
| E-3 | 20.1 | 1250 | 212 |
| E-4 | 13.5 | 1430 | 218 |
| E-5 | 18.2 | 1210 | 209 |

This table shows that the use of copolymers of this invention with PVC composition generally results in an increase in stability. Also evident in this table is that for stability purposes, the epoxidized soy bean oil when used as a stabilizer in PVC compositions is substantially equivalent to the co- and terpolymers of the instant invention.

TABLE V

| | Brabender Fusion Test | |
|---|---|---|
| | Fusion Torque Peak | |
| Sample | Torque mg | Temp. ° C |
| E-1 | 2200 | 320 |
| E-2 | 2200 | 310 |
| E-3 | 1120 | 295 |
| E-4 | 1690 | 314 |
| E-5 | 1400 | 301 |

This table shows the advantages of using the copolymers of the instant invention as indicated by the lower torque values needed to reach fusion peak as opposed to the composition containing the epoxidized soybean oil or the base composition without the use of any additional stabilizer. The lower torque values can be interpreted to mean that such compositions would require less work to flux and therefore easier processability.

Glass transition measurements were performed on samples E-1 to E-5 by use of a differential scanning calorimeter (DSC). The results are found in TABLE VI below.

TABLE VI

| Glass Transition Determinations | |
|---|---|
| Sample | Glass Transition (Tg, ° C) |
| E-1 | 72.0 |
| E-2 | 63.5 |
| E-3 | 74.0 |
| E-4 | 77.0 |
| E-5 | 74.5 |

This table illustrates the most critical aspect of the instant invention, which is, the fact that the glass transition temperature of a PVC composition is not lowered when the stabilizers of the instant invention are used. In fact, the glass transition temperature is surprisingly increased. This increase in glass transition temperature is important because it also correlates to an increase in softening temperatures, which also correlates to a PVC container which will less likely sag or distort when filled with hot substances.

EXAMPLES 6 – 8

24 grams of glycidyl methacrylate were placed in an autoclave 1 gallon reactor along with 1050 ml of cyclohexane into which 1100 psi of ethylene was introduced over a period of 1.5 hours at a temperature of about 105° C. 10 grams of lauroyl peroxide were introduced into said reactor over a period of 1.5 hours. The copolymer was recovered and its physical properties measured; the results are shown in Table VII.

TABLE VII

| PROPERTIES OF COPOLYMER OF EXAMPLE 6 | |
|---|---|
| Product Weight | 156 g |
| Melting Point | 102° C |
| Saponification No. (ASTM D-94) | 25.8 |
| Glycidyl Methacrylate (GMA)wt% | 6.5 |
| Epoxide Equivalent, moles/kg | 0.65 |
| Calculated wt % GMA In Resin | 9.0 |

The Epoxide Equivalent was determined by dissolving 1.7 g of the above prepared copolymers in methyl ethyl ketone and refluxing for 10 minutes and subsequently titrating with 1 normal HCl. The following formula was used to calculate the Epoxide Equivalent:

$$\text{Epoxide Equivalent (moles/kg)} = \frac{\text{ml HCl} \times \text{Normality}}{\text{wt sample, g}}$$

Two separate blends were prepared by dry blending 5 phr of Epoflex 945 (E-7) and 5 phr of the previously prepared ethylene/glycidyl methacrylate copolymer (E-8) with the Basic Formulation of Table II in a high speed Papenmeier mixer by first mixing at a speed of 1200 rpm for 1 minute then further mixing at a speed of 3600 rpm for an additional 2 minutes. E-6 represents only the Basic Formulation of Table II.

Brabender stability and fusion tests were run as previously described and the results are shown in Table VIII and IX.

TABLE VIII

| | Brabender Stability Test | | | |
|---|---|---|---|---|
| Sample | Fusion Peak Time,sec | Torque mgm | Time to Breakdown min | Torque Before Breakdown mgm |
| E-6 | 40 | 3150 | 10.5 | 1600 |
| E-7 | 45 | 2850 | 17.2 | 1500 |
| E-8 | 240 | 1200 | 17.6 | 1450 |

TABLE IX

| | Brabender Fusion Test | | |
|---|---|---|---|
| | | Fusion Peak | |
| Sample | Time,sec | Torque,mgm | Temp, °C |
| E-7 | 12 | 2050 | 165 |

TABLE IX-continued

| | Brabender Fusion Test | | |
|---|---|---|---|
| | | Fusion Peak | |
| Sample | Time,sec | Torque,mgm | Temp, °C |
| E-8 | 18 | 450 | 169 |

These tables also show the advantages of blends of the instant invention as evidenced by the lower torque values required to reach fusion peak as opposed to the torque value required when a liquid stabilizer such as epoxidized soybean oil is used. The melting point of the ethylene/glycidyl methacrylate copolymer (102° C) is also high enough so that it will not lower the glass transition temperature (softening point) of the finished product when blended with the PVC composition of the instant invention.

It is to be understood that this invention is not restricted to the foregoing examples which serve only to illustrate the present invention. Numerous variations may be devised without departing from the scope of this invention.

What is claimed is:

1. A method for preparing a polyvinyl chloride composition which comprises blending with polyvinyl chloride resin about 1 to about 50 parts based on 100 parts of resin of a copolymer of polypropylene having grafted thereon a saturated epoxy monomer selected from the group consisting of glycidyl methacrylate, glycidyl acrylate, allyl glycidyl ether, vinyl glycidyl phthalate and allyl glycidyl phthalate, wherein said composition has improved thermal stability and a glass transition temperature equal to or greater than the glass transition temperature of the polyvinyl chloride resin.

* * * * *